United States Patent
Cain

(10) Patent No.: US 8,348,082 B2
(45) Date of Patent: Jan. 8, 2013

(54) PULL-TAB SEALING MEMBER

(75) Inventor: R. Michael Cain, Lancaster, PA (US)

(73) Assignee: Tab It LLC, Mountville, PA (US)

( * ) Notice: Subject to any disclaimer, the term of this patent is extended or adjusted under 35 U.S.C. 154(b) by 157 days.

(21) Appl. No.: 12/863,240

(22) PCT Filed: Jan. 19, 2009

(86) PCT No.: PCT/US2009/031385
§ 371 (c)(1),
(2), (4) Date: Dec. 7, 2010

(87) PCT Pub. No.: WO2009/092066
PCT Pub. Date: Jul. 23, 2009

(65) Prior Publication Data
US 2011/0100989 A1    May 5, 2011

Related U.S. Application Data

(60) Provisional application No. 61/022,046, filed on Jan. 18, 2008.

(51) Int. Cl.
*B65D 17/34* (2006.01)
(52) U.S. Cl. .............. 220/359.2; 220/270; 215/232
(58) Field of Classification Search .......... 220/270, 220/359.2, 359.3; 215/232, DIG. 2
See application file for complete search history.

(56) References Cited

U.S. PATENT DOCUMENTS

| | | | |
|---|---|---|---|
| 4,961,986 A | 10/1990 | Galda et al. | |
| 5,433,992 A | 7/1995 | Galda et al. | |
| 6,461,714 B1 * | 10/2002 | Giles | 428/126 |
| 2001/0023870 A1 * | 9/2001 | Mihalov et al. | 220/359.3 |
| 2006/0068163 A1 | 3/2006 | Giles | |

FOREIGN PATENT DOCUMENTS

| | | | |
|---|---|---|---|
| JP | 02005093544 A | * | 4/2005 |
| WO | 9325375 | | 12/1993 |
| WO | 2006108853 A1 | | 10/2006 |

* cited by examiner

*Primary Examiner* — J. Gregory Pickett
*Assistant Examiner* — Mollie Llewellyn
(74) *Attorney, Agent, or Firm* — The Webb Law Firm

(57) ABSTRACT

A pull-tab sealing member includes a bottom laminate sheet, a top laminate sheet, and a tube portion. The bottom laminate sheet includes a support layer having a bottom surface facing the container and a top surface on the opposite side thereof, a lower polymer layer disposed on the bottom surface of the support layer, and an adhesive coating formed on a bottom surface of the lower polymer layer for securing the bottom laminate sheet to the container. The top laminate sheet includes a polymer support having a bottom surface and a top surface and an adhesive layer disposed on the bottom surface of the polymer support layer. The tube portion includes a polymer tubed layer secured to a portion of the top surface of the support layer of the bottom laminate sheet and a tubed tab portion formed integrally with the polymer tubed layer and secured to a portion of the adhesive layer of the top laminate sheet. The support layer of the bottom laminate sheet is secured to the adhesive layer of the top laminate sheet by a remaining portion of the adhesive layer and the polymer support layer, the tubed tab portion, and the portion of the adhesive layer therebetween form a tab portion.

23 Claims, 4 Drawing Sheets

PULL-TAB SEALING MEMBER

CROSS REFERENCE TO RELATED APPLICATIONS

This application claims benefit of U.S. Provisional Patent Application No. 61/022,046 entitled "Pull-Tab Sealing Member" filed Jan. 18, 2008, which is hereby incorporated by reference in its entirety.

BACKGROUND OF THE INVENTION

1. Field of the Invention

The present invention relates, in general, to a sealing member or closure for a container and, more particularly, to a sealing member that includes a tab to facilitate removal of the sealing member.

2. Description of Related Art

It is often desirable to seal a bottle, jar or other container with a closure to maintain freshness of the contents thereof or to indicate whether the container has been tampered with. However, it is also desirable that the closure be easy to remove by the user. For example, U.S. Pat. No. 5,433,992 to Galda et al. describes a top-tabbed closure for a container which has a membrane for sealing the container and a sheet which is bonded to the top of the membrane, in a manner which leaves a tab portion of the sheet free. A user seeking to gain access to the contents of the container simply grips the tab with their fingers and by pulling on the tab, which is connected to the sheet, can remove the entire closure and access the contents of the container in a relatively convenient manner.

Referring generally to FIG. 1, a conventional top-tabbed closure is shown generally at the top of a bottle 10 as container seal 100. A cross-sectional view of seal 100, taken along line 2-2 of FIG. 1, which is not drawn to scale, is shown in FIG. 2. Seal 100 includes a lower section 101, comprising a lower layer 110 which is formed of an adhesive, such as a hot melt adhesive or other sealants, for securing seal 100 to the top of bottle 10. Lower section 101 also includes a foil layer 120 and a polyethylene terephthalate (PET) layer 130 between foil layer 120 and lower layer 110. Seal 100 also includes an upper section 102 which includes an ethylene vinyl acetate (EVA) layer 170 having a PET top layer 180 disposed thereon. A bottom surface 150 of EVA layer 170 is surface treated and bonded to foil layer 120. Bottom surface 150 also bonds a paper release layer 140 to EVA layer 170. Thus, release layer 140 prevents EVA layer 170 from being completely bonded to foil layer 120 at lower surface 150. Bottom surface 150 only bonds EVA layer 170 to foil layer 120 up to a boundary line 160 so as to permit a tab portion 200 to be graspable. However, this bond between upper section 102 and lower section 101 is strong enough, so that pulling tab portion 200 can remove all of seal 100 in one piece.

Conventional container seals can exhibit disadvantages. For example, a paper release or information layer can be sensitive to exposure to moisture. Additionally, the use of PET release layers alone does not provide a fully satisfactory seal. Corrosion of foil layers can also present a problem. Also, conventional closures typically require containers to have smooth surfaces to insure proper bonding and release. Uneven heating during heat sealing steps has also occurred. Many closures will not separate from the container satisfactorily when the tab is pulled, and tearing and unsatisfactorily incomplete removal has occurred.

Accordingly, a need exists for an improved container seal which overcomes the above-described drawbacks and provides advantages compared to conventional container seals.

SUMMARY OF THE INVENTION

The present invention is directed to a pull-tab sealing member configured to be secured to a lip around an opening of a container. The pull-tab sealing member includes a bottom laminate sheet, a top laminate sheet, and a tube portion. The bottom laminate sheet includes a support layer having a bottom surface facing the container and a top surface on the opposite side thereof; a lower polymer layer disposed on the bottom surface of the support layer and an adhesive coating formed on a bottom surface of the lower polymer layer for securing the bottom laminate sheet to the container. The top laminate sheet includes a polymer support having a bottom surface and a top surface and an adhesive layer disposed on the bottom surface of the polymer support layer. The tube portion includes a polymer tubed layer secured to a portion of the top surface of the support layer of the bottom laminate sheet and a tubed tab portion formed integrally with the polymer tubed layer and secured to a portion of the adhesive layer of the top laminate sheet. The support layer of the bottom laminate sheet is secured to the adhesive layer of the top laminate sheet by a remaining portion of the adhesive layer; and the polymer support layer, the tubed tab portion, and the portion of the adhesive layer therebetween form a tab portion.

A portion of the bottom laminate sheet may be secured to a portion of the top laminate sheet in a sufficiently strong manner, such that when the adhesive coating at the bottom surface of the lower polymer layer of the bottom laminate sheet is secured to the container, the bottom laminate sheet is removed by pulling on the tab portion.

The support layer may be formed from a metal foil. The lower polymer layer may be formed from PET, nylon, polyethylene naphthalate (PEN), polypropylene, or any combination thereof. The adhesive coating may be heat-activated. The polymer support may be formed from PET, PEN, nylon, or any combination thereof. The adhesive layer may be one of a polyester coating, ethylene vinyl acetate, an ethylene-acrylic acid copolymer, and surlyn. The tube portion may be formed from PET. The tube portion may have words, symbols, logos, or any combination thereof printed thereon.

The present invention is also directed to a container sealed with a pull-tab sealing member secured to a lip around an opening of the container. The pull-tab sealing member includes a bottom laminate sheet, a top laminate sheet, and a tube portion. The bottom laminate sheet includes a support layer having a bottom surface facing the container and a top surface on the opposite side thereof, a lower polymer layer disposed on the bottom surface of the support layer, and an adhesive coating formed on a bottom surface of the lower polymer layer for securing the bottom laminate sheet to the container. The top laminate sheet includes a polymer support having a bottom surface and a top surface and an adhesive layer disposed on the bottom surface of the polymer support layer. The tube portion includes a polymer tubed layer secured to a portion of the top surface of the support layer of the bottom laminate sheet and a tubed tab portion formed integrally with the polymer tubed layer and secured to a portion of the adhesive layer of the top laminate sheet. The support layer of the bottom laminate sheet is secured to the adhesive layer of the top laminate sheet by a remaining portion of the adhesive layer, and the polymer support layer, the tubed tab portion, and the portion of the adhesive layer therebetween form a tab portion.

The present invention is also a pull-tab sealing member configured to be secured to a lip around an opening of a container. The pull-tab sealing member includes a bottom laminate sheet and a tube member. The bottom laminate sheet includes: a support layer having a bottom surface facing the container and a top surface on the opposite side thereof; a lower polymer layer disposed on the bottom surface of the support layer; and an adhesive coating formed on a bottom surface of the lower polymer layer for securing the bottom laminate sheet to the container. The tube member includes: a polymer tubed layer secured to a portion of the top surface of the support layer of the bottom laminate sheet; and a tubed tab portion formed integrally with the polymer tubed layer. The tubed tab portion of the tube member forms a tab portion such that when a force is applied to the tab portion, the bottom laminate sheet is removed from the container.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures.

DETAILED DESCRIPTION OF THE PRESENT INVENTION

Figure 1:
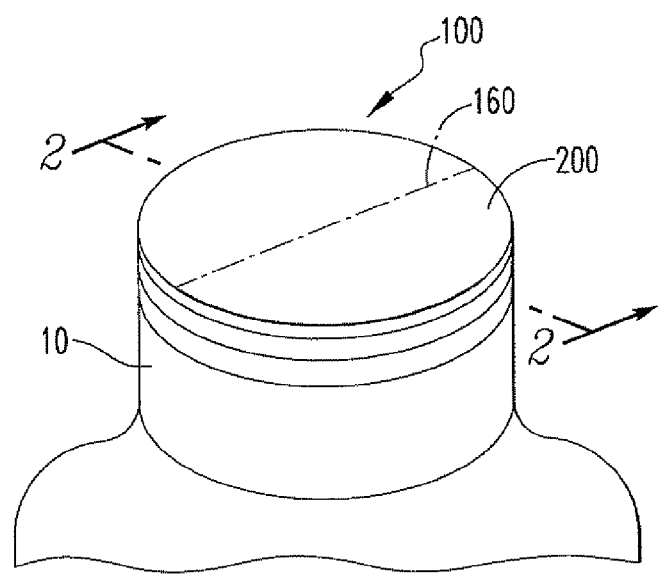
FIG. 1 is a perspective view of a conventional closure disposed over the mouth of a bottle.
Figure 2:
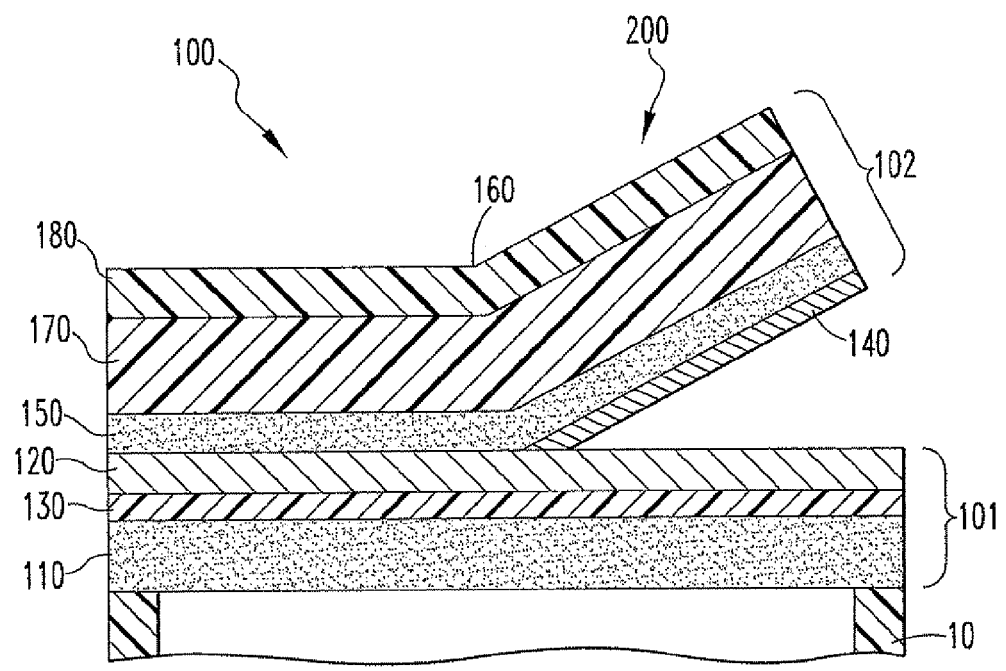
FIG. 2 is a cross-sectional view of the closure of FIG. 1 taken along line 2-2.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention.

Figure 3:
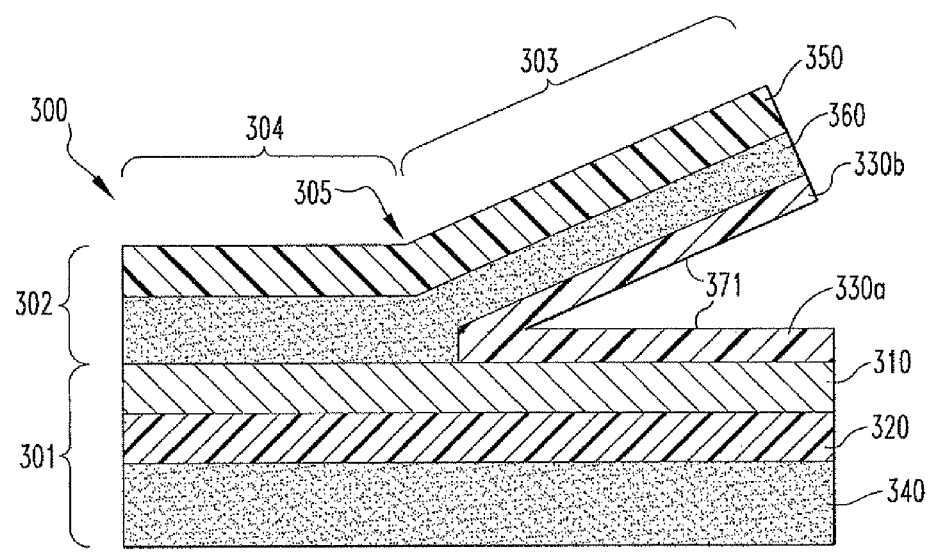
FIG. 3 is a side cross-sectional view of a seal in accordance with the present invention.

A seal for a container constructed in accordance with the present invention is shown generally in FIG. 3 as seal 300. The relative thicknesses of the layers shown in FIG. 3 are not to scale. Furthermore, the construction shown is provided for purposes of illustration only, and is not intended to be construed in a limiting sense.

Seal 300 is constructed from a bottom laminate sheet 301 and a top laminate sheet 302. Bottom sheet 301 includes a support layer 310 having a lower polymer layer 320 on the underside thereof and a polymer tubed layer 330a on a portion of the top surface thereof. Support layer 310 may be formed of a moisture proof material such as aluminum foil or any other suitable metal foil. Support layer 310 may be about 0.0005 to 0.0020 inches thick.

Lower polymer layer 320 may be formed of PET or any other suitable material, and may have a thickness ranging from about 0.0004 to 0.0015 inches. Other suitable materials include nylon, PEN, and polypropylene. The bottom surface of bottom sheet 301 is coated with a sealant or adhesive 340. Sealant or adhesive 340 may be a heat-activated adhesive. The type of adhesive is based in part on the characteristics of the container. Suitable adhesives (as used herein, the term sealant will include adhesives suitable for adhering a container seal in accordance with the present invention to a container) include polyester coatings, ethylene vinyl acetate, polypropylene, ethylene-acrylic acid copolymers, surlyn, and other materials known in the industry.

Top laminate sheet 302 is formed with a polymer support 350 that includes an adhesive layer 360 on a bottom surface thereof. Polymer support 350 may be formed from a strong heat resistant sheet-like material, which can maintain its strength at small thicknesses and which has high pull strength. An example of such a material is PET and other suitable materials include PEN and nylon. Adhesive layer 360 is advantageously formed of any industry standard thermoset adhesive and may be from 0.0001 to 0.003 inches thick.

Top sheet 302 also includes a tubed tab portion 330b, which is integral with polymer tubed layer 330a adhered to bottom sheet 301. Tubed tab portion 330b is bonded to a portion of adhesive layer 360. The remainder of adhesive layer 360 is directly adhered to a top surface of support layer 310 of bottom laminate sheet 301, thereby forming a joining portion 304. Integral polymer tubed layer 330a and tubed tab portion 330b are positioned such that they are folded up and away from bottom sheet 301 to provide a gripping tab portion 303 for removing seal 300 from the top of the container once dissected. A hollow boundary 305 exists at the interface between gripping tab portion 303 and joining portion 304. Boundary 305 extends in a straight line from edge to edge of seal 300. Boundary 305 is positioned at or near the middle of seal 300.

A uniform bond strength is achieved by securing a portion of adhesive layer 360 to tubed tab portion 330b and securing the remainder of the adhesive layer to the top surface of support layer 310. This uniform bond strength prevents top laminate sheet 302 from de-laminating from bottom laminate sheet 301 when a user applies a force to gripping tab portion 303.

Integral polymer tubed layer 330a and tubed tab portion 330b are comprised of PET or a similar polymer that is extrudeable thermoplastic with heat resistance and relative shrink-free features. It may be white colored or clear, and may have words, symbols, logos, or the like printed thereon. The interior surfaces of the integral polymer tubed layer 330a and tubed tab portion 330b may include a release agent formed of a coat of release material 371. Release material 371 may include various known heat resistant coatings such as silicone release coatings.

Bottom sheet 301 can be formed by adhering polymer layer 320 to support layer 310 with an adhesive. Suitable adhesives include ethylene acrylic acid copolymers, curable two-part urethane adhesives, and epoxy adhesives. As used herein, the term adhesive will include curable adhesives, heat-activated adhesives, and thermoplastics.

Figure 6:
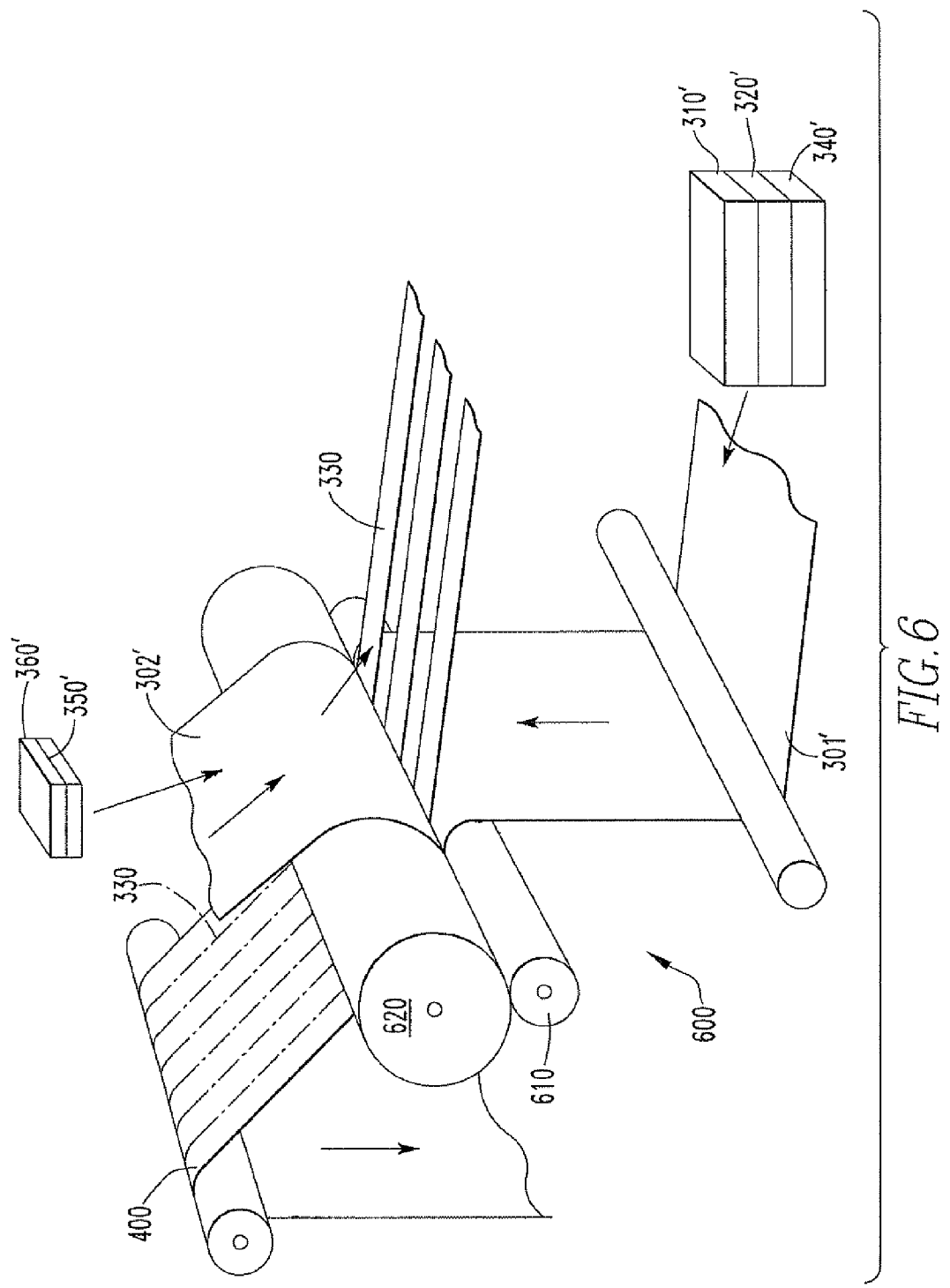
FIG. 6 is a demonstrative perspective view of an apparatus constructing sheets for forming container seals in accordance with the present invention.

With reference to FIG. 6, an apparatus in accordance with the present invention for forming a laminated sheet from which seals 300 can be obtained is shown generally as apparatus 600.

A bottom sheet 301' including a support layer 310' with a bottom polymer coat 320' having sealant 340' on the bottom surface thereof is fed to a nip where a pressure roll 610 meets a hot roll 620. A top sheet 302' is also fed into the nip between pressure roll 610 and hot roll 620. Top sheet 302' includes a support film 350' and an adhesive layer 360' on support film 350'. Top sheet 302' is fed into the nip between rolls 610 and 620 such that adhesive layer 360' faces support layer 310'. Strips of polymer tubing 330 are combined with and inserted between top sheet 302' and bottom sheet 301' in a parallel spaced arrangement. After heat from hot roll 620 joins top sheet 302', polymer tubing 330, and bottom sheet 301', a laminate sheet 400 results.

Figure 4:
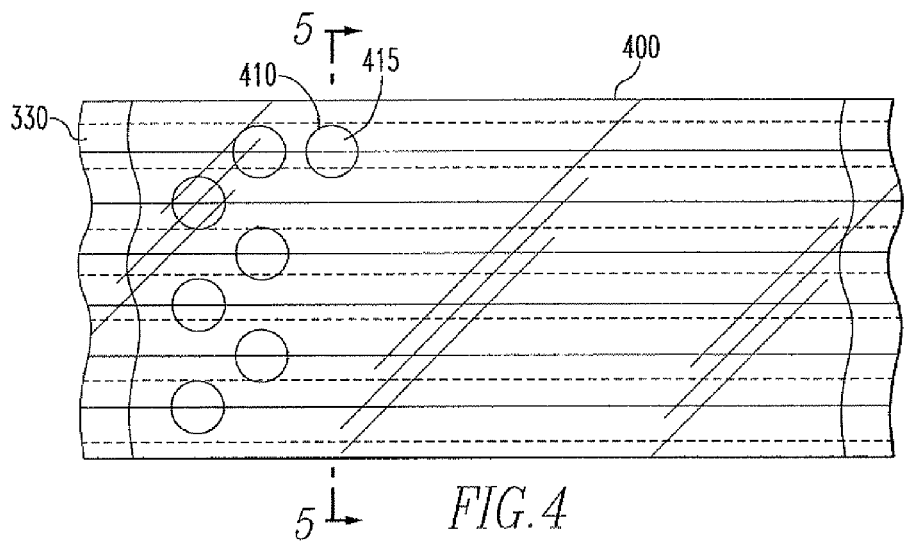
FIG. 4 is a top plan view of a sheet used to form seals in accordance with the present invention.
Figure 5:
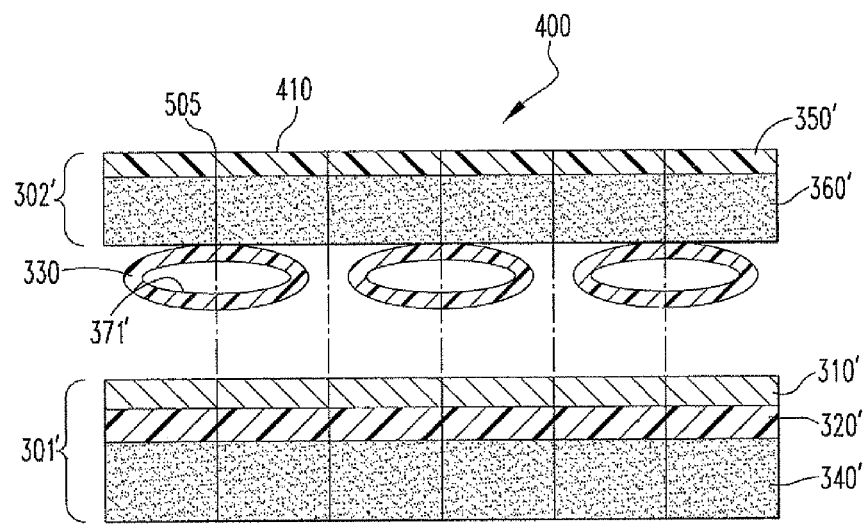
FIG. 5 is a partially exploded cross-sectional view of the sheet of FIG. 4 taken along line 5-5.

Laminate sheet 400 is shown in plan view in FIG. 4 and in cross-section in FIG. 5. The relative size of the layers is not shown to scale and top sheet 302' and bottom sheet 301' are not shown in a fully laminated joined structure. Also, adhesive between the layers has not been shown. However, those of ordinary skill in the art would understand how to adhere these multiple layers. To form seals in accordance with the present invention, circular (or other appropriately shaped) portions 410 are die cut from sheet 400. As can be seen in FIG. 4, a boundary 415 is established at the center of each strip of polymer tubing 330. When each circular portion 410 is die cut from sheet 400, the strip of polymer tubing 330 is cut through a center portion thereof (as shown by lines 505 in FIG. 5) creating a u-shaped structure formed of polymer tubed layer 330a and tubed tab portion 330b. This u-shaped structure thereby forms tab portion 303. The inside surface of the strips of polymer tubing may be coated with a release agent 371'.

Figure 7:
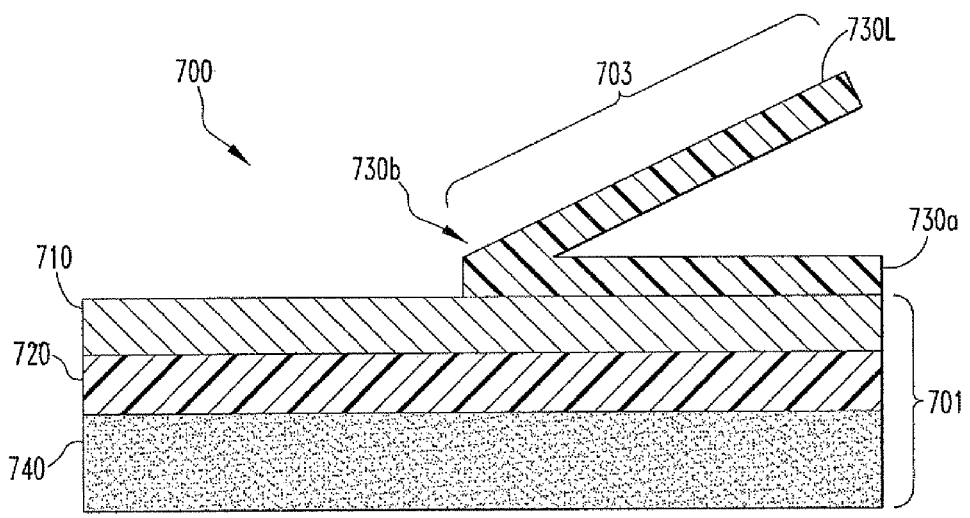
FIG. 7 is a side cross-sectional view of an alternative embodiment of the seal in accordance with the present invention.

An alternative embodiment of the seal of the present invention may be constructed without top laminate sheet 302. With reference to FIG. 7, such a seal, denoted generally as reference numeral 700, is constructed from a bottom laminate sheet 701 and tube member 730. Bottom laminate sheet 701 includes a support layer 710 having a lower polymer layer 720 on the underside thereof and a polymer tubed layer 730a of tube member 730 on a portion of the top surface thereof. As with the embodiment shown in FIG. 3, support layer 710 may be formed of a moisture proof material such as aluminum foil or any other suitable metal foil. Support layer 710 may be about 0.0005 to 0.0020 inches thick.

Lower polymer layer 720 may be formed of PET or any other suitable material, and may have a thickness ranging from about 0.0004 to 0.0015 inches. Other suitable materials include nylon, PEN, and polypropylene. The bottom surface of bottom sheet 701 is coated with a sealant or adhesive 740. Sealant or adhesive 740 may be a heat-activated adhesive. The type of adhesive is based in part on the characteristics of the container. Suitable adhesives (as used herein, the term sealant will include adhesives suitable for adhering a container seal in accordance with the present invention to a container) include polyester coatings, ethylene vinyl acetate, polypropylene, ethylene-acrylic acid copolymers, surlyn, and other materials known in the industry.

Tube member 730 further includes a tubed tab portion 730b that is integral with polymer tubed layer 730a. Tube member 730 is positioned such that it is folded up and away from bottom laminate sheet 701 such that tubed tap portion 730b provides a gripping tab portion 703 for removing seal 700 from the top of the container once dissected. Tube member 730 is comprised of PET or a similar polymer that is extrudeable thermoplastic with heat resistance and relative shrink-free features.

The following example is provided for purposes of illustration only and is not intended to be construed in a limiting sense.

A 0.7 mm aluminum foil sheet was adhered to a 0.5 mm PET film with adhesive. A 1.5 mm sealant film was then adhesive-laminated to the PET surface of the foil/PET laminate thereby forming a bottom sheet. The top sheet was adhered to the bottom sheet with a thermal bonding process after strips of PET tubing were inserted therebetween. Circular seals, approximately 1.5 inches in diameter, were die cut from the strips, with a central region of the strip of PET tubing extending approximately down the midpoint of the circle, to yield tabs having a base running down the middle of the seals from edge to edge.

One advantageous method of attaching container seals in accordance with the present invention to the tops of containers is with heat activated adhesive. The adhesive can be heated through induction heating by utilizing a metal foil support in the bottom sheet of the seal, such as an aluminum foil support sheet.

Container seals in accordance with preferred embodiments of the invention were found to bond well to the top surface of a container, without the need to oversize the seal and have portions of the seal extend beyond the top edge of the container, providing a neater appearance. Container seals, in accordance with the invention, were also found to provide adequate sealing even when the top surface of the container was not substantially smooth, such as in the case of containers having mold lines or other imperfections on the top surface thereof. Container seals in accordance with the invention were also shown to exhibit substantially improved water resistance compared to container seals in which paper is exposed or in which a metal foil surface is either exposed or covered with only paper. Thus, container seals in accordance with the invention were shown to exhibit reduced corrosion from exposure to water or juices.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. Furthermore, it is to be understood that the present invention contemplates that, to the extent possible, one or more features of any embodiment can be combined with one or more features of any other embodiment.

The invention claimed is:

1. A pull-tab sealing member configured to be secured to a lip around an opening of a container, the pull-tab sealing member comprising:
 (a) a bottom laminate sheet comprising:
  a support layer having a bottom surface facing the container and a top surface on the opposite side thereof;
  a lower polymer layer disposed on the bottom surface of the support layer; and
  an adhesive coating formed on a bottom surface of the lower polymer layer for securing the bottom laminate sheet to the container;
 (b) a top laminate sheet comprising:
  a polymer support having a bottom surface and a top surface; and
  an adhesive layer disposed on the bottom surface of the polymer support layer; and (c) a tube portion comprising:
  a polymer tubed layer having a bottom surface directly secured to a portion of the top surface of the support layer of the bottom laminate sheet with an outer edge of the bottom surface of the polymer tubed layer meeting and ending at an outer edge of the top surface of the bottom laminate sheet; and
  a tubed tab portion formed integrally with the polymer tubed layer and secured to a portion of the adhesive layer of the top laminate sheet,
wherein the support layer of the bottom laminate sheet is secured to the adhesive layer of the top laminate sheet by a remaining portion of the adhesive layer and the polymer support layer, the tubed tab portion and the portion of the adhesive layer therebetween form a tab portion.

2. The pull-tab sealing member of claim 1, wherein a portion of the bottom laminate sheet is secured to a portion of the top laminate sheet in a sufficiently strong manner such that when the adhesive coating at the bottom surface of the lower polymer layer of the bottom laminate sheet is secured to the container, the bottom laminate sheet is removed by pulling on the tab portion.

3. The pull-tab sealing member of claim 1, wherein the support layer is formed from a metal foil.

4. The pull-tab sealing member of claim 1, wherein the lower polymer layer is formed from PET, nylon, PEN, polypropylene, or any combination thereof.

5. The pull-tab sealing member of claim 1, wherein the adhesive coating is heat-activated.

6. The pull-tab sealing member of claim 1, wherein the polymer support is formed from PET, PEN, nylon, or any combination thereof.

7. The pull-tab sealing member of claim 1, wherein the adhesive layer is one of a polyester coating, ethylene vinyl acetate, an ethylene-acrylic acid copolymer, and surlyn.

8. The pull-tab sealing member of claim 1, wherein the tube portion is formed from PET.

9. The pull-tab sealing member of claim 1, wherein the tube portion has words, symbols, logos, or any combination thereof printed thereon.

10. A container sealed with a pull-tab sealing member secured to a lip around an opening of the container, the pull-tab member comprising:
  (a) a bottom laminate sheet comprising:
    a support layer having a bottom surface facing the container and a top surface on the opposite side thereof;
    a lower polymer layer disposed on the bottom surface of the support layer; and
    an adhesive coating formed on a bottom surface of the lower polymer layer for securing the bottom laminate sheet to the container;
  (b) a top laminate sheet comprising:
    a polymer support having a bottom surface and a top surface; and
    an adhesive layer disposed on the bottom surface of the polymer support layer; and
  (c) a tube portion comprising:
    a polymer tubed layer having a bottom surface directly secured to a portion of the top surface of the support layer of the bottom laminate sheet with an outer edge of the bottom surface of the polymer tubed layer meeting and ending at an outer edge of the top surface of the bottom laminate sheet; and
    a tubed tab portion formed integrally with the polymer tubed layer and secured to a portion of the adhesive layer of the top laminate sheet,
  wherein the support layer of the bottom laminate sheet is secured to the adhesive layer of the top laminate sheet by a remaining portion of the adhesive layer and the polymer support layer, the tubed tab portion and the portion of the adhesive layer therebetween forms a tab portion.

11. The container of claim 10, wherein a portion of the bottom laminate sheet is secured to a portion of the top laminate sheet in a sufficiently strong manner such that when the adhesive coating at the bottom surface of the lower polymer layer of the bottom laminate sheet is secured to the container, the bottom laminate sheet is removed by pulling on the tab portion.

12. The container of claim 10, wherein the support layer is formed from a metal foil.

13. The container of claim 10, wherein the lower polymer layer is formed from PET, nylon, PEN, polypropylene, or any combination thereof.

14. The container of claim 10, wherein the adhesive coating is heat-activated.

15. The container of claim 10, wherein the polymer support is formed from PET, PEN, nylon, or any combination thereof.

16. The container of claim 10, wherein the adhesive layer is one of a polyester coating, ethylene vinyl acetate, an ethylene-acrylic acid copolymer, and surlyn.

17. The container of claim 10, wherein the tube portion is formed from PET.

18. The container of claim 10, wherein the tube portion has words, symbols, logos, or any combination thereof printed thereon.

19. A pull-tab sealing member configured to be secured to a lip around an opening of a container, the pull-tab sealing member comprising:
  (a) a bottom laminate sheet comprising:
    a support layer having a bottom surface facing the container and a top surface on the opposite side thereof;
    a lower polymer layer disposed on the bottom surface of the support layer; and
    an adhesive coating formed on a bottom surface of the lower polymer layer for securing the bottom laminate sheet to the container; and
  (b) a tube member comprising:
    a polymer tubed layer having a bottom surface directly secured to a portion of the top surface of the support layer of the bottom laminate sheet with an outer edge of the bottom surface of the polymer tubed layer m and ending at an outer edge of the top surface of the bottom laminate sheet; and
    a tubed tab portion formed integrally with the polymer tubed layer,
  wherein the tubed tab portion of the tube member forms a tab portion such that when a force is applied to the tab portion, the bottom laminate sheet is removed from the container.

20. The pull-tab sealing member of claim 19, wherein the tube portion is formed from PET.

21. The pull-tab sealing member of claim 1, wherein the bottom surface of the polymer tubed layer is in contact with only the portion of the top surface of the support layer of the bottom laminate sheet to which it is secured.

22. The container of claim 10, wherein the bottom surface of the polymer tubed layer is in contact with only the portion of the top surface of the support layer of the bottom laminate sheet to which it is secured.

23. The pull-tab sealing member of claim 19, wherein the bottom surface of the polymer tubed layer is in contact with only the portion of the top surface of the support layer of the bottom laminate sheet to which it is secured.

* * * * *

UNITED STATES PATENT AND TRADEMARK OFFICE
CERTIFICATE OF CORRECTION

| | |
|---|---|
| PATENT NO. | : 8,348,082 B2 |
| APPLICATION NO. | : 12/863240 |
| DATED | : January 8, 2013 |
| INVENTOR(S) | : R. Michael Cain |

It is certified that error appears in the above-identified patent and that said Letters Patent is hereby corrected as shown below:

Column 8, Line 42, Claim 19, delete "m" and insert -- meeting --

Signed and Sealed this
Twenty-sixth Day of February, 2013

Teresa Stanek Rea
*Acting Director of the United States Patent and Trademark Office*